US006291575B2

United States Patent
Yukawa et al.

(10) Patent No.: US 6,291,575 B2
(45) Date of Patent: *Sep. 18, 2001

(54) PHOSPHORIC ACID GROUP-CONTAINING NON-AQUEOUS DISPERSION AND A PROCESS FOR THE APPLICATION THEREOF

(75) Inventors: Yoshiyuki Yukawa, Hiratsuka; Yutaka Masuda, Fujisawa; Akimasa Nakahata, Hiratsuka, all of (JP)

(73) Assignee: Kansai Paint Co., Ltd., Hyogo-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,307

(22) Filed: Jun. 5, 1998

(30) Foreign Application Priority Data

Jun. 5, 1997 (JP) .................................................. 9-163441
Jun. 18, 1997 (JP) .................................................. 9-161415

(51) Int. Cl.$^7$ .................................................. C08L 43/02
(52) U.S. Cl. ...................... 524/521; 524/547; 523/523; 526/274; 526/277
(58) Field of Search .................................. 524/547, 521; 523/523; 526/274, 277

(56) References Cited

U.S. PATENT DOCUMENTS 4,525,499 * 6/1985 Hayashi et al. ........................ 523/523
5,191,029 * 3/1993 DelDonno ............................. 524/547
5,780,113 * 7/1998 Masuda et al. ....................... 427/405
5,929,140 * 7/1999 Fujii et al. ............................ 524/522

FOREIGN PATENT DOCUMENTS 0 458 245   11/1991  (EP) .

OTHER PUBLICATIONS

*Patent Abstracts of Japan*, 18(52) (C–1158) (Jan. 1994) (abstract of JP 5–271580).

* cited by examiner

*Primary Examiner*—Tae H. Yoon
(74) *Attorney, Agent, or Firm*—Wenderoth, Lind & Ponack, L.L.P.

(57) ABSTRACT

This invention relates to a phosphoric acid group-containing non-aqueous dispersion wherein polymer particles are dispersed in a solution of a macromolecular dispersion stabilizer dissolved in an organic solvent, said polymer particle being a particle of polymer comprising a phosphoric acid group-containing polymerizable unsaturated monomeric unit as a constituent component. With use of said phosphoric acid group-containing non-aqueous dispersion, there can be improved interlayer adhesivity between a metallic coating film, which is formed from a leafing type aluminum flake pigment, and another coating film adjacent thereto, without reducing the excellent effects such as dense metallic feeling of the coated surface, a chrome plating-like finish, and strong brightness feeling and strong flip-flop perperties, which are produced by such a metallic coating film.

15 Claims, No Drawings

PHOSPHORIC ACID GROUP-CONTAINING NON-AQUEOUS DISPERSION AND A PROCESS FOR THE APPLICATION THEREOF

This invention relates to a non-aqueous dispersion which comprises, as dispersed particles, a phosphoric acid group-containing polymer, and to a process for the formation of a leafing type aluminum flake-containing metallic multi-layer coating film which is formed with use of said non-aqueous dispersion.

There has already been known a technique to form, on a substrate such as an automobile body panel, a multi-layer coating film, by applying an aluminum flake pigment-containing metallic coating on said substrate, and then applying, on the resultant coated surface, a clear coating which is capable of forming a transparent film.

The aluminum flake pigment to be compounded in a metallic coating is classified into a leafing type one and a non-leafing type one. In a metallic coating film which contains a leafing type aluminum flake pigment, the aluminum flake pigment floats up to the surface of said coating film (which phenomenon is called leafing) to form a continuous and dense aluminum plane which is oriented substantially parallel to the coated surface, resulting in the achievement of special effects such as a chrome plating-like finish, glittering brightness and strong flip-flop properties.

This metallic coating film per se is, however, inferior in chemical resistance such as acid resistance since aluminum flake pigment floats up to the surface of said coating film. In order to overcome this defect, the coated surface of said metallic coating film is usually coated with a clear coating. However, when a clear coating is applied onto the coated surface of a metallic coating film while the metallic coating is uncured, the orientation of leafing type aluminum flake is disturbed, resulting in the deterioration of a chrome plating-like finish (which phenomenon is called mottling). On the other hand, when a clear coating is applied after the metallic coating film is heat-cured, the interlayer adhesivity between the metallic coating film and the clear coating film is caused to be insufficient. Hence, it has been impossible to fully produce the above-mentioned various advantageous effects of a leafing type aluminum flake-containing metallic coating film.

As for a non-leafing type aluminum flake, it is uniformly dispersed in the whole of a coating film without causing leafing. Hence, when a clear coating is applied onto the surface of a metallic coating, there occurs neither mottling nor the reduction in interlayer adhesivity. However, brightness feeling and flip-flop effects are weak, and, moreover, it is difficult to achieve a metallic coating film having a chrome plating-like finish.

In view of the above situation, the inventors of this invention made an assiduous study on how to improve the interlayer adhesivity between a metallic coating film and an adjacent film, without causing reduction in the above-mentioned special effects (e.g., dense metallic appearance of the coated surface, a chrome plating-like finish, strong brightness and flip-flop effects) possessed by a leafing type aluminum flake pigment-containing metallic coating film.

As a result, the inventors have newly developed a phosphoric acid group-containing non-aqueous dispersion, and have found out that, when a clear coating which contains said non-aqueous dispersion is applied on a metallic cured film which contains the above-mentioned leafing type aluminum flake pigment, the interlayer adhesivity between the metallic coating film and the clear coating can be improved.

The inventors have further found out that the interlayer adhesivity between a leafing type aluminum flake pigment-containing metallic coating film and another coating film can be improved by applying a base coating which contains a phosphoric acid group-containing resin composition, and, without curing said base coating, applying a leafing type aluminum flake pigment-containing metallic composition on the coated surface of said base coating, and, after curing these coatings, applying on the resultant coated surface a clear coating which contains the above-mentioned phosphoric acid group-containing non-aqueous dispersion.

Thus, this invention provides a non-aqueous dispersion (hereinafter referred to as non-aqueous dispersion of this invention) which comprises polymer particles dispersed in a solution of macromolecular dispersion stabilizer dissolved in an organic solvent, said polymer particles being particles of polymer which comprises, as a constituent component, a phosphoric acid group-containing polymerizable unsaturated monomeric unit.

This invention also provides a process (hereinafter referred to as Application Process I of this invention) for the formation of a multi-layer coating film which process is characterized by using, as a clear coating, a coating which contains the non-aqueous dispersion of this invention, when forming a multi-layer coating film by applying a leafing type aluminum flake-containing metallic coating, and, after curing said coating, applying a clear coating on the resultant coated surface.

This invention further provides a process (hereinafter referred to as Application Process II of this invention) for the formation of a multi-layer coating film which process is characterized by applying a base coating which contains a phosphoric acid group-containing resin composition, and, without curing said base coating, applying a leafing type aluminum flake pigment-containing metallic composition on the resultant coated surface of said base coating, and, after curing these coatings, applying on the resultant coated surface a clear coating which contains the non-aqueous dispersion of this invention.

The following is a further detailed explanation of the non-aqueous dispersion of this invention and the Application Processes I and II of this invention.

NON-AQUEOUS DISPERSION OF THIS INVENTION

A non-aqueous dispersion which comprises polymer particles dispersed in a solution of macromolecular dispersion stabilizer dissolved in an organic solvent, said polymer particles being produced by polymerizing monomeric unit which contains a phosphoric acid group-containing polymerizable unsaturated monomer.

The polymer of the polymer particles in the non-aqueous dispersion of this invention can be produced by polymerizing either a phosphoric acid group-containing polymerizable unsaturated monomer alone or a monomeric component which comprises a phosphoric acid group-containing polymerizable unsaturated monomer and another copolymerizable monomer.

Examples of said phosphoric acid group-containing polymerizable unsaturated monomer include a compound which has, in one molecule, both at least one phosphoric acid group represented by formula $$—OPO(OH)(R_1) \qquad (1)$$

wherein $R_1$ is a hydroxyl group, a phenyl group or an alkyl group having 1 to 20, especially 2 to 10, carbon atoms and at least one polymerizable unsaturated bond. Concretely, there are mentioned acid-phosphoxy-$C_{1-20}$ (especially $C_{2-10}$)alkyl (meth)acrylates such as acid-phosphoxyethyl acrylate, acid-phosphoxyethyl methacrylate, acid-phosphoxypropyl acrylate, acid-phosphoxypropyl mothacrylate, acid-phosphoxydecyl acrylate, acid-phosphoxydecyl methacrylate and the like.

As a phosphoric acid group-containing polymerizable unsaturated monomer, there can also be used an equimolar adduct of glycidyl (meth)acrylate with mono-$C_{1-20}$ alkylphosphoric acid ester.

Furthermore, as a phosphoric acid group-containing polymerizable unsaturated monomer, there can also be used compounds represented by the formula

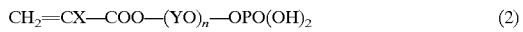

$$CH_2=CX-COO-(YO)_n-OPO(OH)_2 \quad (2)$$

wherein X denotes hydrogen atom or methyl group; Y denotes alkylene group having 2 to 4 carbon atoms; and n denotes an integer of 3 to 30, especially 3 to 20.

This monomer can be prepared for example by adding alkylene oxide to (meth)acrylic acid to form polyalkylene glycol monoester, which is then allowed to react with phosphorus oxychloride to form phosphate monoester, which is then hydrolyzed. This phosphorus oxychloride can be replaced with orthophosphoric acid, metaphosphoric acid, phosphoric acid anhydride, phosphorus trichloride or phosphorus pentachloride. The above-mentioned alkylene oxide can be used in an amount of at least stoichiometric amount in accordance with the number "n" in the above formula (2), preferably for example, in an amount ranging from 3 to 60 moles per mole of (meth)acrylic acid. Alkylene oxide has preferably 2 to 4 carbon atoms, and its examples include ethylene oxide, propylene oxide and butylene oxide. The above-mentioned addition reaction can be completed within 0.5 to 5 hours at a temperature of 40 to 200° C.

The reaction of monoesterification of phosphorus oxychloride after the above addition reaction can be completed within 0.5 to 5 hours at a temperature of 0 to 100° C. Phosphorus oxychloride may be used almost in a stoichiometric amount. According to necessity, it may be used in an amount ranging from 1 to 3 moles per mole of the adduct. Thereafter, the resultant monoester is hydrolyzed by a usual method, and, thus, the compounds of formula (2) are obtained. Examples of said compounds include acid-phosphoxyhexa (or dodeca) (oxypropylene) monomethacrylate.

Among the above-mentioned phosphoric acid group-containing polymerizable unsaturated monomers, acid-phosphoxy-$C_{2-10}$ alkyl (meth)acrylates are especially preferable.

These phosphoric acid group-containing polymerizable unsaturated monomers may be used either alone or in combination of two or more species.

As another monomeric unit which is copolymerizable with the above-mentioned phosphoric acid group-containing polymerizable unsaturated monomers, there can be used compounds which have at least one polymerizable unsaturated bond in one molecule. Concretely, the following can be mentioned:

a) Esters of (meth)acrylic acid:

For example, $C_{2-18}$ alkyl esters of (meth)acrylate acid such as methyl (meth)acrylate, ethyl (meth)acrylate, propyl (meth)acrylate, isopropyl (meth)acrylate, butyl (meth)acrylate, hexyl (meth)acrylate, octyl (meth)acrylate, lauryl (meth)acrylate and stearyl (meth)acrylate; glycidyl ester such as glycidyl (meth)acrylate; $C_{2-8}$ alkenyl esters of (meth)acrylic acid such as allyl (meth)acrylate; $C_{2-8}$ hydroxyalkyl esters of (meth)acrylic acid such as hydroxyethyl (meth)acrylate and hydroxypropyl (meth)acrylate; $C_{3-18}$ alkenyloxy alkyl esters of (meth)acrylic acid such as allyloxyethyl (meth)acrylate; esters between $C_{2-8}$ hydroxyalkyl esters of (moth)acrylic acid and caprolactone which are available under tradenames PLACCEL FA-1, FA-2, FA-3, FA-4, FA-5, FM-1, FM-2, FM-3, FM-4, FM-5 and FM-6 (produced by Daicel Chemical Industries, Ltd.); diesters between (meth)acrylic acid and glycols such as ethylene glycol and propylene glycol.

b) Vinyl aromatic compounds:

For example, styrene, α-methylstyrene, vinyl toluene, p-chlorostyrene, vinylpyridine and divinyl benzene, and the like.

c) α,β-Ethylenically unsaturated acids:

For example, (meth)acrylic acid, maleic acid and itaconic acid.

d) (Meth)acrylic acid amides:

For example, (meth)acrylamide, n-butoxymethyl (meth)acrylamide and n-methylol (meth)acrylamide.

e) Others:

For example, (meth)acrylonitrile, methylisopropenyl ketone, vinyl acetate, Veova monomer (tradename of a product produced by Shell Chemical), vinyl propionate, vinyl pivalate, isocyanate ethyl (meth)acrylate, perfluorocyclohexyl (meth)acrylate, p-styrene sulfonamide, N-methyl-p-styrene sulfonamide and γ-methacryloxy oxy propyltrimethoxy silane.

Among the above monomers, esters of (meth)acrylic acid are preferably used. It is desirable that at least a part of the same should be hydroxyl group-containing unsaturated monomers such as $C_{2-8}$ hydroxyalkyl esters of (meth)acrylic acid or esters between $C_{2-8}$ hydroxyalkyl esters of (meth) acrylic acid and caprolactone.

The monomeric component from which to prepare the polymer of polymer particles in the non-aqueous dispersion of this invention comprises a phosphoric acid group-containing polymerizable unsatureated monomer as an essential ingredient and, if necessary, another copolymerizable monomer. The ratio of these monomers are not specifically restricted, and may optionally be changed according to objective. Generally, however, phosphoric acid group-containing polymerizable unsatureated monomer accounts for 0.1–100% by weight, especially 0.5–50% by weight, most desirably 3–30% by weight based on the total of phosphoric acid group-containing polymerizable unsatureated monomer and the other monomer, and said other monomer accounts for 99.9–0% by weight, especially 99.5–50% by weight, most preferably 97–70% by weight.

As for the above-mentioned hydroxyl group-containing unsaturated monomer, it is usable in an amount of 0–80% by weight, especially 1–50% by weight, most desirably 5–40% by weight based on the total monomers.

The non-aqueous dispersion of this invention can be prepared by polymerizing the above-mentioned monomeric components into the form of particles in a solution of macromolecular dispersion stabilizer in an organic solvent. There can resultantly be obtained a non-aqueous dispersion wherein polymer particles derived from the above-mentioned monomeric components are dispersed in a solution of macromolecular dispersion stabilizer dissolved in an organic solvent.

The purpose of using a macromolecular dispersion stabilizer is to disperse polymer particles stably in a dispersion. Usable macromolecular dispersion stabilizer is compatible with organic solvent in said dispersion, but is substantially incompatible with coexistent particles of polymer which comprises, as a constituent component, a phosphoric acid group-containing polymerizable unsaturated monomer unit.

Examples of such a macromolecular dispersion stabilizer include the followings, which may be used either alone or in combination of two or more species.

1) Polyester macromonomer (1a) which is produced by adding, by esterification, a glycidyl ester of (meth)acrylic acid to a carboxyl group of a self condensation polyester resin of a fatty acid which has a hydroxyl group such as 12-hydroxystearic acid; and Polymer (1b) which is produced by polymerizing a polymerizable monomer with a polymerizable unsaturated bond in said polyester macromonomer (1a).

2) Polymer (2a) which is produced by polymerizing the above-mentioned polyester macromonomer (1a) with a polymerizable monomer which contains a glycidyl ester of (meth)acrylic acid, and by further adding α,β-ethylenically unsaturated acid to glycidyl group in the resultant polymer so as to introduce polymerizable unsaturated bond. Usually, the amount of said polymerizable unsaturated bond to be introduced is preferably, on average, 0.2 to 1.2 in number, especially 0.5 to 1 in number, per molecule.

3) Hydroxyl group-containing acrylic resin which is produced by polymerizing a polymerizable monomeric component which contains both $C_{4-22}$ alkyl ester of (meth) acrylic acid and a hydroxyl group-containing polymerizable monomer.

4) Acrylic resin (4a) which is produced by introducing a polymerizable unsaturated bond, by means of adding α,β-ethylenically unsaturated acid, into a glycidyl group of a hydroxyl group-containing acrylic resin which is produced by polymerizing a polymerizable monomeric component which contains $C_{4-22}$ alkyl ester of (meth)acrylic acid, a hydroxyl group-containing polymerizable monomer such as $C_{2-8}$ hydroxyalkyl esters of (meth)acrylic acid and glycidyl ester of (meth)acrylic acid; and Acrylic resin (4b) which is produced by introducing a polymerizable unsaturated bond, by means of adding glycidyl ester of (meth)acrylic acid, into a carboxyl group of a hydroxyl group-containing acrylic resin which is produced by polymerizing a polymerizable monomeric component which contains monoester between an alkyl having four or more carbon atoms and (meth)acrylic acid, a hydroxyl group-containing polymerizable monomer and α,β-ethylenically unsaturated acid. In each of these resins (4a) and (4b), usually 0.2 to 1.2 in number, especially 0.5 to 1 in number, on average, of said polymerizable unsaturated bond is preferably introduced per one molecule.

5) Alkyl-etherified melamine resin which has a high allowability for mineral spirit.

6) Oil-modified alkyd resin having an oil length of at least 15% by weight, preferably 20 to 40% by weight. Or alkyd resin into which a polymerizable unsaturated bond has been introduced by means of adding glycidyl ester of (meth) acrylic acid to carboxyl group in said oil-modified alkyd resin. On average, 0.2 to 1.2 in number, especially 0.5 to 1 in number, of said polymerizable unsaturated bond is preferably introduced into one molecule.

7) Alkyd resin which is produced by adding, by urethane formation, an equimolar reaction product between polyisocyanate and a hydroxyl group-containing polymerizable monomer to hydroxyl group of an oil-modified alkyd resin having at least 15% by weight, preferably 20 to 40% by weight, of oil length so as to introduce a polymerizable unsaturated bond. On average, 0.2 to 1.2 in number, especially 0.5 to 1 in number, of said polymerizable unsaturated bond is preferably introduced into one molecule.

8) Cellulose acetate butyrate having a polymerizable unsaturated bond which is prepared by subjecting a hydroxyl group of cellulose acetate butyrate to a urethane reaction with a monomer such as isocyanate ethyl(meth)acrylate and an equimolar adduct of isophorone diisocyanate with hydroxyethyl acrylate, each of which has both an isocyanate group and a polymerizable unsaturated bond. On average, 0.2 to 1.2 in number, especially 0.5 to 1 in number, of said polymerizable unsaturated bond is preferably introduced into one molecule.

As for the glycidyl ester of (meth)acrylic acid, polymerizable monomer, α,β-ethylenically unsaturated acid, $C_{4-22}$ alkyl ester of (meth)acrylic acid, a hydroxyl group-containing polymerizable monomer and $C_{2-8}$ hydroxyalkyl esters of (meth)acrylic acid in the above dispersion stabilizers, there are usable one or more species which are selected from the afore-mentioned examples.

Generally, the above-mentioned various dispersion stabilizers have a weight average molecular weight ranging from about 1,000 to about 50,000, preferably from about 2000 to about 35,000, and most desirably from about 3,000 to about 20,000.

Moreover, said dispersion stabilizers have a hydroxyl value which ranges generally from 0.5 to 200, especially from 5 to 170, and most desirably from 20 to 140, and have an acid value which ranges generally from 0.5 to 100, especially from 3 to 60, and most desirably from 5 to 40.

Especially preferable among the above dispersion stabilizers are acrylic resins mentioned in the above 3) and 4) which are easily dissolved in a low polarity organic solvent such as aliphatic hydrocarbon, and which have good weatherability. Acrylic resin type dispersion stabilizer which has preferably an average of 0.2 to 1.2 polymerizable unsaturated bonds per one molecule is most desirable since it graft-polymerizes with polymer particles to improve the stability of dispersion. Especially desirable is a polymer (dispersion stabilizer) which is prepared with use of a low polarity monomer, as a main component, such as $C_{4-22}$ alkyl ester of methacrylic acid like n-butyl methacrylate, 2-ethylhexyl methacrylate, dodecyl methacrylate, lauryl methacrylate and stearyl mothacrylate, and, if necessary, together with styrene, methyl (meth)acrylate, ethyl (meth) acrylate, propyl (meth)acrylate, (meth)acrylic acid, glycidyl (meth)acrylate and 2-hydroxyethyl (meth)acrylate. To said polymer, furthermore, glycidyl (meth)acrylate, (meth) acrylic acid or isocyanate ethylmethacrylate is preferably added so as to introduce polymerizable double bond.

Preferably used in the non-aqueous dispersion of this invention is an organic solvent which dissolves macromolecular dispersion sabilizer, and which is capable of dispersing polymer particles without substantially dissolving the same, and which, in particular, has a boiling point at most 150° C. There are concretely mentioned the followings, which may be employed either alone or in combination of two or more species.

Hydrocarbon solvent such as heptane, octane, toluene, xylene and mineral spirit; ester solvent such as ethyl acetate, n-butyl acetate, isobutyl acetate, methyl Cellosolve acetate and butyl Carbitol acetate; ketone solvent such as methylethyl ketone, methylisobutyl ketone and diisobutyl ketone; alcohol solvent such as methanol, ethanol, isopropanol, n-butanol and secbutanol; ether solvent such as n-butyl ether, dioxane, ethyleneglycol monomethylether and ethyleneglycol monoethylether; SWASOL 310, SWASOL 1000 and SWASOL 1500 which are tradenames of petroleum type aromatic hydrocarbon solvent produced by Cosmo Oil Co.

The non-aqueous dispersion of this invention can be produced, for example, by uniformly dissolving the above-mentioned macromolecular dispersion stabilizer in an organic solvent, and subsequently dispersion-polymerizing a monomeric component which contains phosphoric acid group-containing polymerizable unsaturated monomer. It is important that said monomeric component before the dispersion-polymerization should be readily soluble in the solution of macromolecular dispersion stabilizer dissolved in an organic solvent, but that the polymer particles which are formed after the dispersion-polymerization should substantially be insoluble in said solution. In thus obtained non-aqueous dispersion of this invention, the polymer which is derived from monomeric component which comprises a phosphoric acid group-containing polymerizable unsaturated monomer is dispersed, in the form of particles, in a solution of organic solvent which contains a macromolecular dispersion stabilizer dissolved therein. The average particle size of the dispersed polymer particles preferably ranges from 0.01 to 1 $\mu$m, especially from 0.05 to 0.6 $\mu$m.

Dispersion polymerization of the monomeric component which contains a phosphoric acid group-containing polymerizable unsaturated monomer in a solution of a macromolecular dispersion stabilizer dissolved in an organic solvent can easily be conducted by a known method such as radical polymerization. The constituent ratio of these components in the polymerization reaction is not particularly restricted. As for the preferable ratio of macromolecular dispersion stabilizer to monomeric component for example, macromolecular dispersion stabilizer accounts for 3 to 90%, in particular 5 to 70%, while monomeric component accounts for 97 to 10%, in particular 95 to 30%, based on the total weight of solid contents of these two components. On the basis of the total weight of macromolecular dispersion stabilizer, monomeric component and organic solvent, the total amount of macromolecular dispersion stabilizer and monomeric component accounts for 5 to 70%, in particular 10 to 60%, while organic solvent accounts for 95 to 30%, in particular 90 to 40%.

When a crosslinkable functional group such as hydroxyl group is existent in the molecule of macromolecular dispersion stabilizer and/or polymer particles, a three-dimensionally crosslinked coating film can be formed by means of compounding a crosslinking agent with the non-aqueous dispersion of this invention.

It is also possible to cause crosslinkage in the interior of polymer particle by means of using, as the other copolymerizable monomer which is usable in combination with the phosphoric acid group-containing polymerizable unsaturated monomer, a monomer having at least two polymerizable unsaturated bonds in a molecule such as divinyl benzene or diesters of glycol such as ethylene glycol or propylene glycol with (meth)acrylic acid, in the monomeric component with which to prepare the polymer particle. Intraparticle-crosslinked polymer can be prepared also by using, together with the above-mentioned monomer, another monomer which has a self crosslinking reactive functional group such as N-alkoxymethylated acrylamide or γ-methacryloxytrialkoxysilane in dispersion polymerization.

The non-aqueous dispersion of this invention is usable for a coating composition or an adhesive. According to purpose, there may be compounded an additive such as crosslinking agent, other polymer particles, resin for coating composition, pigment, curing catalyst, UV light absorber, painted surface adjustor, antioxidant, fluidity adjustor, pigment dispersing agent and silane coupling agent.

Examples of crosslinking agent include melamine resin, polyisocyanate compound which may be blocked, epoxy compound and hydrolyzable alkoxysilyl compound.

As an example of said other polymer particles, there can be mentioned both a powder which can be produced by separating particles from an aqueous dispersion of polymer particles, and a dispersion which can be produced by replacing water of said aqueous dispersion of polymer particles with an organic solvent, said aqueous dispersion of polymer particles being obtained by subjecting a polymerizable monomeric component which contains a small amount of monomer having, in one molecule, at least two polymerizable unsaturated bonds to emulsion-polymerization in an aqueous medium, with use of an anionic or nonionic surfactant. Generally, said other polymer particles are preferably compounded in a proportion of 0.1 to 30 parts by weight, in particular 1 to 20 parts by weight, on the basis of 100 parts by weight of solid contents of the total of macromolecular dispersion stabilizer and phosphoric acid group-containing polymer particles.

Examples of resin for coating composition include cellulose acetate butyrate, epoxy resin, polyester resin, alkyd resin and acrylic resin. These resins for coating composition preferably account for 0.1 to 100 parts by weight, in particular 1 to 60 parts by weight, based on 100 parts by weight of solid contents of the total of macromolecular dispersion stabilizer and phosphoric acid group-containing polymer particles.

As pigment, there are usable one, two or more species which are selected from usual solid color pigment and metallic pigment for paint. Examples of solid color pigment include quinacridone type one such as quinacridone; azo type one such as pigment red; phthalocyanine type one such as phthalocyanine blue and phthalocyanine green; titanium white; barium sulfate; barium carbonate; carbon black; baryta; clay; silica; chrome vermilion; permanent red; perylene vermilion; titanium yellow; antimony yellow; indanthrene type one; chrome green; ultramarine; cyanine blue; cobalt violet; and quinacridone violet. Examples of metallic pigment include flake pigment which gives metallic feeling or light interference to a coating film, such as mica-like iron oxide, mica, stainless steel, brass, titanium oxide-coated mica and iron oxide-coated mica, which are not restrictive however.

A coating composition which contains the non-aqueous dispersion of this invention can be applied to a material to be coated such as metal (e.g., steel plate and surface-treated steel plate) and plastic; as a primer, an intermediate coat or a top coat. A film formed from the coating composition which contains the non-aqueous dispersion of this invention is treated under a condition which may appropriately be chosen according to the species of crosslinking agent etc. which are contained according to necessity. Hence, there can be employed normal temperature drying, normal temperature curing, heat drying and heat curing. Thus formed coating film is excellent in weatherability, interlayer adhesivity, chipping resistance, and the like.

APPLICATION PROCESS I OF THIS INVENTION

A process to form a multi-layer coating film which is characterized in that, when a leafing type aluminum flake-containing metallic coating (A) is applied, and, after curing, a clear coating is applied on the resultant coated surface, there is used as said clear coating a coating (B) which contains the non-aqueous dispersion of this invention.

A leafing type aluminum flake, as stated above, tends to float up to the surface of a coating film which contains the same (which phenomenon is called leafing), forming a continuous aluminum plane which is oriented substantially parallel to the coated surface in the surface layer of said coated surface. However, when a clear coating is applied onto an uncured surface of a metallic coating film, the orientation of aluminum flake which has floated to the surface layer is disturbed, resulting in the occurrence of mottling. On the other hand, when a clear coating is applied after the metallic coating film is heat-cured, the interlayer adhesivity between the metallic coating film and the clear coating film does not become sufficient.

The application process of this invention has been developed with a view to achieving, as a main object, the improvement of the interlayer adhesivity between said two coating films in a system wherein a clear coating is applied after a leafing type aluminum flake-containing metallic coating film is heat-cured. This process is characterized by using, as said clear coating, a coating composition which contains the non-aqueous dispersion of this invention.

For the metallic coating (A) which is used in the application process of this invention, there can be employed a liquid coating which comprises a vehicle component and a leafing type aluminum flake metallic pigment.

For the above-mentioned vehicle component, there can be used a known vehicle component for metallic coating, such as a vehicle comprising a resin having a crosslinkable functional group such as a hydroxyl group and a crosslinking agent. Examples of said crosslinkable functional group-containing resin include an acrylic resin, a polyester resin, an alkyd resin, etc. each of which has two or more hydroxyl groups in one molecule. Of these resins, a hydroxyl group-containing acrylic resin is particularly preferred. As for crosslinking agent, there is suitably used a melamine resin which is reactive with said crosslinkable functional group. Concretely, there is preferably used a partially or fully etherified methylol melamine resin having 1 to 5 triazine nuclei wherein a part or the whole of the methylol groups of methylol melamine has been etherified with a monohydric alcohol having 1 to 8 carbon atoms. An imino group-containing melamine resin or a (blocked) polyisocyanate compound can also be used as a crosslinking agent. As for the compounding ratio of the crosslinkable functional group-containing resin to the crosslinking agent, the crosslinkable functional group-containing resin accounts for 50 to 90% by weight, particularly 65 to 80% by weight, while the crosslinking agent accounts for 50 to 10% by weight, particularly 45 to 20% by weight, based on the total of the solid contents of these two components.

The aluminum of leafing type aluminum flake pigment which is used for metallic coating (A) is, when mechanically ground, preferably coated on its surface with a low surface tension component such as stearic acid. Said leafing type aluminum flake pigment appropriately has a lengthwise direction size of 2 to 50 μm and a thickness of 0.1 to 2 μm. When a coating composition which contains such a leafing type aluminum flake pigment is applied, the aluminum flake floats up to the surface layer of the coated surface, and is oriented almost parallel to the coated surface, and, thus, there can be formed a metallic coating film having a high density, strong brightness and a chrome plating-like finish.

In metallic coating (A), said leafing type aluminum flake pigment is compounded preferably in a proportion of 1 to 50 parts by weight, in particular 3 to 25 parts by weight, on the basis of 100 parts (solid) by weight of the above-mentioned vehicle component (i.e., total amount of a crosslinkable functional group-containing resin and a crosslinking agent).

The metallic coating (A) can be produced by mixing and dispersing the above components in an organic solvent. If necessary, a coloring pigment, an extender pigment, an anti-settling agent, a UV light absorber, etc. may be further compounded.

As for the organic solvent used for metallic coating (A), any solvent for painting may be employed without special restriction. Particularly preferable is a solvent for painting which contains an organic solvent having a surface tension as high as at least 27 dyn/cm, especially 30 dyn/cm. Examples of such solvents include hydrocarbon type ones such as xylene, toluene, tetralin and solvent naphtha; ester type ones such as Cellosolve and butyl Cellosolve; alcohol type ones such as decanol, dodecanol and benzylalcohol; ketone type ones such as cycloheptane and cyclohexane.

The organic solvent used for metallic coating (A) may either consist of the above-mentioned high surface tension organic solvent alone or be a mixture system comprising said high surface tension organic solvent and other organic solvent. In said mixture system, the above-mentioned high surface tension organic solvent preferably accounts for at least 50% by weight, in particular at least 60% by weight, based on the total solvents in the mixture system.

As for the concentration of the solid content of metallic coating (A) when applied, it may normally range from about 5% by weight to about 60% by weight.

The metallic coating (A) can be applied onto a metallic or a plastic substrate such as an automobile body panel, by electrostatic coating, spray coating or the like, either directly or after applying a primer (e.g., a cationic electrocoating) onto the surface of said metallic or a plastic substrate, heat-curing the resulting primer film, then applying an intermediate coating if necessary, and appropriately heat-curing the resulting intermediate coating film. Wet-on-wet application of the metallic coating (A) on uncured film of intermediate coating, these two coatings subsequently heat-cured, can effectively shorten the application step. Generally, the film of the metallic coating (A) has preferably a thickness ranging from 1 to 20 μm, in particular from 2 to 10 μm, as a cured film. The film of metallic coating (A) can be cured by heating at a temperature of about 100 to about 180° C. for about 10 to 40 minutes.

Clear coating (B) which is to be applied on the heat-cured coated surface of metallic coating (A) may form either a colorless transparent coating film or a colored transparent coating film. As clear coating (B), there is usable a non-aqueous dispersion type liquid paint which contains the non-aqueous dispersion of this invention (a non-aqueous dispersion wherein particles of polymer which comprises phosphoric acid group-containing polymerizable unsaturated monomer unit as a constituent component are dispersed in a solution of macromolecular dispersion stabilizer dissolved in an organic solvent), and which, if necessary, further comprises other normal resin for paint, solid color pigment or metallic pigment, UV light absorber, etc. mixed with an organic solvent, and which is capable of forming a film which is clear at least to such an extent that the metallic feeling of the metallic coating (A) can be seen through.

In clear coating (B), the content (as solid) of the non-aqueous dispersion of this invention may be varied in a wide range. Generally, however, said content preferably ranges from 1 to 80% by weight, in particular from 3 to 50% by weight, most desirably from 5 to 30% by weight, based on the total solid contents.

Examples of other usual resin for paint which may be compounded with clear coating (B) include acrylic resin, polyester resin, alkyd resin, fluororesin, urethane resin and silicon-containing resin, each of which has a crosslinkable functional group such as hydroxyl group, epoxy group, carboxyl group, silanol group or the like. Crosslinkable functional group-containing acrylic resin is preferable in particular. A resin which contains the above-mentioned crosslinkable functional group may be used in combination with a crosslinking agent such as melamine resin, urea resin, (blocked) polyisocyanate compound, epoxy compound or resin, carboxyl group-containing compound or resin, acid anhydride and alkoxysilane group-containing compound or resin, each of which is reactive with the above-mentioned functional group. As melamine resin, there is preferably used a partially or fully etherified methylol melamine resin having 1 to 5 triazine nuclei wherein a part or the whole of the methylol groups of methylol melamine has been etherified with a monohydric alcohol having 1 to 8 carbon atoms. An imino group-containing melamine resin is also usable. As for the compounding ratio of the crosslinkable functional group-containing resin to the crosslinking agent in said other usual resin for paint, the crosslinkable functional group-containing resin accounts for 50 to 90% by weight, particularly 65 to 80% by weight, while the crosslinking agent accounts for 50 to 10% by weight, particularly 45 to 20% by weight, based on the total of the solid contents of these two components.

In clear coating (B), the constituent proportion of the non-aqueous dispersion of this invention to said other usual resin for paint (including crosslinking agent) may be optional depending on the objective. Generally, however, the non-aqueous dispersion of this invention accounts for 0.01 to 100% by weight (as solid), in particular 2 to 20% by weight (as solid), further especially desirably 3 to 15% by weight (as solid), while said other usual resin for paint accounts for 99.99 to 0% by weight, in particular 98 to 80% by weight, and most desirably 97 to 85% by weight, based on the total amount of solid contents of these two components.

As examples of organic solvent in clear coating (B), there are mentioned solvents like hydrocarbon type ones such as hexane, heptane, xylene, toluene and cyclohexane; ester type ones such as methyl acetate, ethyl acetate, ethylene glycol acetate monomethyl ether and diethylene glycol acetate monomethyl ether; ether type ones such as isopropylether, ethylene glycol monomethyl ether and diethylene glycol monobutyl ether; alcohol type ones such as ethyl alcohol, butyl alcohol and hexyl alcohol; ketone type ones such as methyl isobutyl ketone, methylethyl ketone, isophorone and acetophenone.

In Application Process I of this invention, metallic coating (A) is applied in the above-mentioned manner, and, after the resulting coating film is heat-cured, clear coating (B) is applied.

The concentration of solid content of clear coating (B) when applied preferably ranges from about 30 to about 80% by weight. This clear coating (B) is applied by electrostatic method or spray method so that the thickness of film as cured may be 5 to 100 $\mu$m, preferably 20 to 80 $\mu$m, and, then, the film is cured.

In a multi-layer coating film composed of a leafing type aluminum flake-containing metallic coating film and a clear coating film, according to the above-mentioned Application Process I of this invention, when a clear coating film is formed from a clear coating composition which contains the non-aqueous dispersion of this invention, there can be improved the interlayer adhesivity between said metallic coating film and clear coating film without decreasing the effects of a chrome plating-like finish with dense and strongly bright coated surface which is derived from aluminum plane which is continuously oriented in parallel to the surface layer of the metallic coating film.

Moreover, thus formed multi-layer coating film has good heat insulation as compared with other coating films. Therefore, in an automobile whose body panel is coated with the multi-layer coating film of this invention, the inside temperature is hard to be affected by outdoor conditions.

The leafing aluminum flake which is oriented in parallel to the surface layer of the metallic coating film has its surface coated with stearic acid etc., and has a low surface tension. Hence, when the coated surface of this leafing aluminum flake is coated with clear coating, wettability sometimes decreases. By use of a clear coating which contains the non-aqueous dispersion of this invention, however, wettability is improved.

There is a further merit as follows. Even though a resin for painting which comprises a functional group (e.g., epoxy group) reactive with phosphoric acid group is contained in the non-aqueous dispersion of this invention and in the clear coating (B) of Application Process I of this invention, these two groups are prevented from reacting with each other since phosphoric acid group-containing polymer is protected with a dispersion stabilizer, with the result that storage stability is not deteriorated.

APPLICATION PROCESS II OF THIS INVENTION

A process to form a multi-layer coating film which is characterized by applying base coating (C) which contains a phosphoric acid group-containing resin composition, and, without curing this base coating (C), applying leafing type aluminum flake pigment-containing metallic composition (D), and, after curing this metallic composition (D), applying clear coating (B) which contains the non-aqueous dispersion of this invention on the coated surface of said metallic composition (D).

Base Coating (C) Which Contains Phosphoric Acid Group-Containing Resin Composition Base coating (C) is a paint which is to be applied on a material to be coated, prior to the application of metallic composition (D) which is mentioned later. By providing the coating film of this base coating (C) in adjacent to, and just under the coating film of said metallic composition (D), there can remarkably be improved the adhesivity between metallic composition (D) and intermediate coating or primer coating which is applied under the metallic composition (D).

Base coating (C) is a paint which contains a phosphoric acid group-containing resin composition. As said phosphoric acid group-containing resin composition, one or more species may be selected for use from the followings:

(P-1) Polymer containing a phosphoric acid group and a hydroxyl group in one molecule, which is prepared with use of a phosphoric acid group-containing unsaturated monomer and a hydroxyl group-containing unsaturated monomer as constituent components.

(P-2) Phosphoric acid group-containing non-aqueous dispersion, i.e., the non-aqueous dispersion of this invention, which comprises polymer particles dispersed in a solution of macromolecular dispersion stabilizer dissolved in an organic solvent, polymer of said particles comprising a phosphoric acid group-containing unsaturated monomer unit as a constituent component.

As phosphoric acid group-containing unsaturated monomer which is to be used for the preparation of polymer (P-1) containing a phosphoric acid group and a hydroxyl group, there can be mentioned the phosphoric acid group-containing unsaturated monomer set forth above which constitutes, as monomeric component, the polymer particles in the non-aqueous dispersion of this invention.

The hydroxyl group-containing unsaturated monomer is a compound having, in one molecule, a hydroxyl group and a polymerizable unsaturated bond. Examples of said monomer include $C_{2-20}$, in particular $C_{2-10}$ hydroxyalkyl (meth) acrylates such as hydroxyethyl (meth)acrylate, hydroxypropyl (meth)acrylate, hydroxybutyl (meth)acrylate and the like. Examples of this monomer further include PLACEL's FA-1, FA-2, FA-3, FA-4, FA-5, FM-1, FM-2, FM-3, FM-4, FM-5 and FM-6 (trade names of the products of Daicel Chemical Industries, Ltd.), which are each an ester of the above-mentioned hydroxyalkyl (meth)acrylate and caprolactone.

The polymer (P-1) can be produced by copolymerizing the phosphoric acid group-containing unsaturated monomer, the hydroxyl group-containing unsaturated monomer, and, if necessary, an N-alkoxymethylamide group-containing unsaturated monomer and/or other unsaturated monomer.

The N-alkoxymethylamide group-containing unsaturated monomer is a compound having an N-alkoxymethylamide group and a polymerizable unsaturated bond in one molecule. Examples of said compound include $N-C_{1-6}$ alkoxymethyl (meth)acrylamides such as N-methoxymethyl (meth) acrylamide, N-ethoxymethyl (meth)acrylamide, N-butoxymethyl (meth)acrylamide, N-propoxymethyl (meth)acrylamide and the like. Examples of said other unsaturated monomer include $C_{1-22}$ alkyl (meth)acrylates such as methyl (meth)acrylate, ethyl (meth)acrylayte, propyl (meth)acrylate, butyl (meth)acrylate and the like; vinyl aromatic compounds such as styrene, vinyl-toluene and the like; vinyl monomers such as acrylonitrile, vinyl acetate, vinyl chloride and the like; olefins such as ethylene, propylene and the like; and carboxyl group-containing unsaturated compounds such as (meth)acrylic acid, maleic acid, maleic anhydride and the like.

As for the ratio of the phosphoric acid group-containing monomer to the hydroxyl group-containing monomer in polymer (P-1), the phosphoric acid group-containing monomer preferably acounts for 1 to 50% by weight, in particular 5 to 30% by weight, while the hydroxyl group-containing monomer accounts for 1 to 50% by weight, in particular 5 to 30% by weight, based on the total monomers constituting the polymer (P-1). N-alkoxymethylamide group-containing unsaturated monomer preferably accounts for 30% by weight or less, in particular 1 to 20% by weight, based on the total monomers constituting the polymer (P-1). The remainder is the other unsaturated monomer.

The copolymerization of these monomers is preferably conducted by solution polymerization. The resulting polymer (P-1) preferably has a hydroxyl value of 5 to 150 mg KOH/g, in particular 10 to 120 mg KOH/g, more desirably 30 to 110 mg KOH/g; an acid value, based on the phosphoric acid group, of generally 10 to 150 mg KOH/g, in particular 20 to 130 mg KOH/g; and a number-average molecular weight of 1,000 to 100,000, in particular 3,000 to 50,000, more desirably 5,000 to 30,000.

When comprising N-alkoxymethylamide group-containing monomer unit, this polymer (P-1) becomes self crosslinkable.

Polymer (P-1), when free from any N-alkoxymethylamide group-containing monomer unit, has no self-crosslinkability or self-curability. When used in combination with an N-alkoxymethylamide group-containing monomer, however, polymer (P-1) can be subjected to crosslinking. When polymer (P-1) which is free from any N-alkoxymethylamide group-containing monomer unit is used in combination with a polymer having N-alkoxymethylamide group-containing monomer units in base coating (C), the base coating (C) becomes crosslinkable.

Base coating (C) can be prepared by dissolving or dispersing, in an organic solvent, a phosphoric acid group-containing resin composition such as the above-mentioned polymer (P-1) and the non-aqueous dispersion of this invention (P-2), together with, if necessary, resin for coating composition, crosslinking agent, other polymer particles, extender pigment, curing catalyst, UV light absorber, painted surface adjustor, antioxidant, fluidity adjustor, pigment dispersing agent and silane coupling agent.

Examples of resin for coating composition include polyester resin, alkyd resin, acrylic resin, epoxy resin and cellulose acetate butyrate. These resins for coating composition preferably account for 0.1 to 100 parts by weight, in particular 1 to 60 parts by weight, based on 100 parts by weight of solid content of the phosphoric acid group-containing resin composition.

Examples of crosslinking agent include melamine resin, polyisocyanate compound which may be blocked and epoxy compound.

As an example of said other polymer particles, there can be mentioned both a powder which can be produced by separating particles from an aqueous dispersion of polymer particles, and a dispersion which can be produced by replacing water of said aqueous dispersion of polymer particles with an organic solvent, said aqueous dispersion of polymer particles being obtained by subjecting a polymerizable monomeric component which contains a small amount of monomer having at least two polymerizable unsaturated bonds to emulsion-polymerization in an aqueous medium with use of an anionic or nonionic surfactant. Generally, said other polymer particles compounded preferably account for 0.1 to 30 parts by weight, in particular 1 to 20 parts by weight, on the basis of 100 parts by weight of solid contents of the phosphoric acid group-containing resin composition.

In Application Process II, base coating (C) is to be applied prior to the application of metallic composition (D) which is mentioned later. Base coating (C) can be applied onto a metallic or a plastic substrate such as an automobile body panel, either directly or after coating said substrate with a primer (e.g., a cationic electrocoating), heat-curing the primer, and, if necessary, further applying an intermediate coating, and then appropriately heat-curing the intermediate coating. Wet-on-wet application of the base coating (C) on uncured film of intermediate coating can effectively shorten the application step.

Base coating (C) is applied by air spray, airless spray or electrostatic coating. Thus applied coating film has preferably a thickness ranging from 5 to 20 μm, in particular from 10 to 15 μm, as a cured film.

The film of base coating (C) per se can be crosslinked and cured either at a normal temperature or by heating. In this Application Process II, however, base coating (C) is applied, and, without crosslinking or curing the resulting coating film, metallic composition (D) which is mentioned later is applied on the uncured film of base coating (C).

Leafing Type Aluminum Flake-Containing Metallic Composition (D)

A composition to be applied on uncured film of base coating (C). This composition mainly comprises a leafing type aluminum flake pigment and an organic solvent.

As for said leafing type aluminum flake pigment and organic solvent, there can be employed the same as those which are mentioned with respect to the leafing type aluminum flake-containing metallic coating (A) used in Applicaion Process I of this invention.

As for the proportion of leafing type aluminum flake pigment to organic solvent in metallic composition (D), the leafing type aluminum flake pigment accounts for 1 to 10% by weight, in particular 3 to 7% by weight, while the organic solvent accounts for 99 to 90% by weight, in particular 97 to 93% by weight, on the basis of the total amount of these two components.

The metallic composition (D) can be produced by mixing and dispersing a leafing type aluminum flake pigment in an organic solvent. With the resultant dispersion, if necessary, an anti-settling agent, a UV light absorber, etc. may be further compounded.

The metallic composition (D) can be applied on uncured coated surface of base coating (C) by electrostatic coating, spray coating or the like. Generally, the film of the metallic composition (D) has preferably a thickness ranging from 0.5 to 5 μm, in particular from 0.8 to 3 μm, as a cured film (which is composed of a leafing type aluminum flake pigment only, or may sometimes contain other solid contents).

After the metallic composition (D) is applied, it is preferably heated at a temperature of about 100 to about 180° C. for about 10 to 40 minutes, so that the coating film of base coating (C) may be cured, and that the base coating (C) and the metallic composition (D) may be tightly adhered to each other.

Clear Coating (B)

After metallic composition (D) is applied, and both coating films of base coating (C) and metallic composition (D) are cured, this clear coating (B) is applied on the cured surface of metallic composition (D). The clear coating (B) which is used in Application Process I of this invention can be employed as it is.

In this Application Process II, after base coating (C) and metallic composition (D) are applied and heat-cured, clear coating (B) whose solid content concentration at the time of application has been adjusted to about 30 to about 80% by weight is applied by electrostatic coating, spray coating or the like, so that the cured film may have a thickness ranging from 5 to 100 μm, preferably from 20 to 80 μm, and, then, the applied coating is cured. How to cure clear coating (B) may optionally be chosen according to its composition. In the case of heat curing, the coating is preferably heated at a temperature of about 100 to about 180° C. for about 10 to 40 minutes.

The above-mentioned Application Process II of this invention gives the following effects:

①̂ In a three-layer coating film which comprises base coating film, leafing type aluminum flake-containing metallic coating film and clear coating, when the base coating film and the clear coating film are made to contain a specific phosphoric acid group-containing component, there can remarkably be improved the interlayer adhesivity in said three-layer coating films without decreasing the effects of a chrome plating-like finish with dense and strongly bright coated surface which is derived from leafing type aluminum plane.

②̂ Thus formed multi-layer coating film has good heat insulation as compared with other coating films. Therefore, in an automobile whose body panel is coated with the multi-layer coating film of this invention, the inside temperature is hard to be affected by outdoor conditions.

③̂ The leafing type aluminum flake has its surface coated with stearic acid etc. and has low surface tension. Hence, when the coated surface of this leafing type aluminum flake is coated with clear coating wettability sometimes decreases. In this invention, however, wettability of clear coating is improved.

This invention is described below in more detail by way of Examples. Part and % used in the following each mean a value based on weight.

1. Sample Preparation

1) Piece to Be Coated

Onto a zinc phosphate-treated dull-finish steel plate having a thickness of 0.8 mm, there was applied a thermosetting epoxy resin type cationic electrocoating [Elecron 9600 (trade name of a product of Kansai Paint co., Ltd.] so as to form a film of about 20 μm in thickness as cured. After the applied coating was cured at 170° C. for 30 minutes, there was air sprayed, on thus cured coating film, an intermediate coating for automobile [TP-37 Primer Surfacer (trade name of a thermosetting polyester resin-melamine resin type organic solvent of Kansai Paint Co., Ltd.)] so as to form a film of about 25 μm in thickness as cured. Thus coated plate was then left to stand at room temperature for 3 minutes, and was used for the test piece.

2) Metallic coatings (A)

(A-i)

There were mixed and dispersed, in an organic solvent (xylene/toluene=1/1 by weight), 65 parts by weight of a polyester resin (*1), 35 parts by weight of a melamine resin (*2) and 5 parts by weight of a leafing type aluminum flake (*3), and, then, the viscosity of the resultant mixture was adjusted to 13 seconds (20° C.) by Ford Cup No. 4.

(*1) Polyester resin:

Polyester resin of phthalic anhydride-hexahydrophthalic anhydride type, having a number-average molecular weight of about 3,500, a hydroxyl value of 82 mg KOH/g and an acid value of 8 mg KOH/g.

(*2) Melamine resin:

UBAN 28-60 (trade name of a product of Mitsui Toatsu Chemicals, Inc.)

(*3) Leafing Aluminum Flake:

[0620MS] (trade name of a paste containing 32 % of mineral spirit, each flake having a lengthwise direction size of 13.6 μm and a thickness of 0.4 μm; product of Toyo Aluminium K.K.)

(A-ii) (for comparison)

There were mixed and dispersed, in an organic solvent (xylene/toluene=1/1 by weight), 65 parts by weight of a polyester resin (*1), 35 parts by weight of a melamine resin (*2) and 5 parts by weight of a non-leafing type aluminum flake (*4), and, then, the viscosity of the resultant mixture was adjusted to 13 seconds (20° C.) by Ford Cup No. 4.

(*4) Non-Leafing Aluminum Flake:

ALUMIPASTE 7640 NS (trade name of a paste containing 32% of mineral spirit, each flake having a lengthwise direction size of 17 μm and a thickness of 0.5 μm; product of Toyo Aluminium K.K.)

3) Macromolecular Dispersion Stabilizer for Phosphoric Acid Group-Containing Non-Aqueous Dispersion Dispersion Stabilizer 1

Into a usual reactor for the production of acrylic resin which was equipped with stirrer, thermometer, reflux condenser, etc., there were introduced 52 parts of xylene and 10 parts of n-butanol, which were then heated and stirred. When the temperature reached 125° C., a mixture of the following monomers was added dropwise over a period of four hours.

| | |
|---|---|
| Styrene | 20 parts |
| n-Butylacrylate | 17 parts |
| 2-Ethylhexyl methacrylate | 47 parts |
| 2-Hydroxyethyl acrylate | 10 parts |

-continued

| | |
|---|---|
| Methacrylic acid | 6 parts |
| α, α'-Azobisisobutyronitrile | 3 parts |

After the dropwise addition of the above monomeric mixture was over, the resultant mixture was kept at 125° C. for 30 minutes. Then, to said mixture, there was added dropwise a mixture of 0.5 part of azobisdimethyl valeronitrile and 5 parts of xylene over a period of one hour. The resultant mixture was stirred, while kept at 125° C. for three hours. Thus obtained resin solution had a solid content of 60% and an acid value of 86.5. To this resin solution, 1.2 parts of glycidyl methacrylate was added, and the resultant mixture was subjected to addition reaction at 120° C. until acid value became 83, and, thus, dispersion stabilizer 1 was produced. This dispersion stabilizer 1 had a weight average molecular weight of 12,000, a hydroxyl value of 48.4, an acid value of 83 and a solid content of 60%.

Dispersion Stabilizer 2

Into a usual reactor for the production of acrylic resin which was equipped with stirrer, thermometer, reflux condenser, etc., there were introduced 52 parts of xylene and 10 parts of n-butanol, which were then heated and stirred. When the temperature reached 125° C., a mixture of the following monomers was added dropwise over a period of four hours.

| | |
|---|---|
| Methyl methacrylate | 30 parts |
| n-Butylacrylate | 15 parts |
| 2-Ethylhexyl methacrylate | 47 parts |
| 2-Hydroxyethyl methacrylate | 15 parts |
| Methacrylic acid | 3 parts |
| α, α'-Azobisisobutyronitrile | 3 parts |

After the dropwise addition of the above monomeric mixture was over, the resultant mixture was kept at 125° C. for 30 minutes. Then, to said mixture, there was added dropwise a mixture of 0.5 part of azobisdimethyl valeronitrile and 5 parts of xylene over a period of one hour. The resultant mixture was stirred, while kept at 125° C. for three hours. Thus obtained resin solution had a solid content of 60% and an acid value of 19.2. To this resin solution, 1.2 parts of glycidyl methacrylate was added, and the resultant mixture was subjected to addition reaction at 120° C. until acid value became 16, and, thus, dispersion stabilizer 2 was produced. This dispersion stabilizer 2 had a weight average molecular weight of 12,000, a hydroxyl value of 64.7, an acid value of 16 and a solid content of 60%.

Dispersion Stabilizer 3

Into a usual reactor for the production of polyester resin which was equipped with stirrer, thermometer, fractionater, reflux condenser, etc., there was introduced a mixture of the following reaction components, which was then subjected to a general dehydration-condensation reaction, and, thus, condensation was achieved until acid value became 4.

| | |
|---|---|
| Trimethylol propane | 46.5 parts |
| Hexahydrophthalic acid | 23.6 parts |
| Isophthalic acid | 25.5 parts |
| Coconut oil fatty acid | 35.8 parts |

To the resin solution which was obtained by the above condensation, 1.2 parts of isocyanate ethylmethacrylate was added, and the resultant mixture was subjected to addition reaction until isocyanate value became 0.5 or lower, and, thus, dispersion stabilizer 3 was produced. This dispersion stabilizer 3 had a weight average molecular weight of 30,000, a hydroxyl value of 114, an oil length of 30%, an acid value of 4 and a solid content of 60%.

4) Non-Aqueous Dispersion of This Invention Non-Aqueous Dispersion (i) of This Invention Into a usual reactor for the production of acrylic resin which was equipped with stirrer, thermometer, reflux condenser, etc., there were introduced 120 parts of xylene, 64 parts of heptane and 55 parts of dispersion stabilizer 1, which were then heated and stirred. When the temperature reached 100° C., a mixture of the following monomers and dispersion stabilizer 1 was added dropwise over a period of five hours.

| | |
|---|---|
| Methyl methacrylate | 55 parts |
| Methylacrylate | 10 parts |
| 2-Hydroxyethyl acrylate | 20 parts |
| Acid-phosphoxyethyl methacrylate | 15 parts |
| Dispersion stabilizer 1) | 55 parts |
| α, α'-Azobisisobutyronitrile | 1 parts |

After the dropwise addition of the above mixture was over, the resultant mixture was kept at 100° for further 30 minutes. Then, to said mixture, there was added dropwise a mixture of 0.5 part of azobisdimethyl valeronitrile and 20 parts of xylene over a period of one hour. The resultant mixture was stirred, while kept at 100° C. for two hours. Then, said mixture was cooled, and, thus, there was produced non-aqueous dispersion (i) of this invention. In this dispersion, solid content was 45%, acid value was 70, and phosphoric acid group-containing polymer particles had a particle size of 300 nm.

Non-Aqueous Dispersion (ii) of This Invention

Into a usual reactor for the production of acrylic resin which was equipped with stirrer, thermometer, reflux condenser, etc., there were introduced 120 parts of xylene, 64 parts of heptane and 55 parts of dispersion stabilizer 2, which were then heated and stirred. When the temperature reached 100° C., a mixture of the following monomers and dispersion stabilizer 2 was added dropwise over a period of five hours.

| | |
|---|---|
| Methyl methacrylate | 53 parts |
| Glycidyl methacrylate | 2 parts |
| Methyl acrylate | 10 parts |
| 2-Hydroxyethyl acrylate | 20 parts |
| Acid-phosphoxyethyl methacrylate | 15 parts |
| Dispersion stabilizer 2) | 55 parts |
| α, α'-Azobisisobutyronitrile | 1 parts |

After the dropwise addition of the above mixture was over, the resultant mixture was kept at 100° C. for further 30 minutes. Then, to said mixture, there was added dropwise a mixture of 0.5 part of azobisdimethyl valeronitrile and 20 parts of xylene over a period of one hour. The resultant mixture was stirred, while kept at 100° C. for two hours. Then, said mixture was cooled, and, thus, there was produced non-aqueous dispersion (ii) of this invention which contained intraparticle-crosslinked polymer particles. In this dispersion (ii), solid content was 45%, acid value was 44, and phosphoric acid group-containing polymer particles had a particle size of 250 nm.

Non-Aqueous Dispersion (iii) of This Invention

Into a usual reactor for the production of acrylic resin which was equipped with stirrer, thermometer, reflux condenser, etc., there were introduced 120 parts of xylene, 64 parts of heptane and 55 parts of dispersion stabilizer 3, which were then heated and stirred. When the temperature reached 100° C., a mixture of the following monomers and dispersion stabilizer 3 was added dropwise over a period of five hours.

| | |
|---|---|
| Methyl methacrylate | 55 parts |
| Methyl acrylate | 10 parts |
| 2-Hydroxyethyl acrylate | 20 parts |
| Acid-phosphoxyethyl methacrylate | 15 parts |
| Dispersion stabilizer 3) | 55 parts |
| α, α'-Azobisisobutyronitrile | 1 parts |

After the dropwise addition of the above mixture was over, the resultant mixture was kept at 100° C. for further 30 minutes. Then, to said mixture, there was added dropwise a mixture of 0.5 part of azobisdimethyl valeronitrile and 20 parts of xylene over a period of one hour. The resultant mixture was stirred, while kept at 100° C. for two hours. Then, said mixture was cooled, and, thus, there was produced non-aqueous dispersion (iii) of this invention. In this dispersion (iii), solid content was 45%, acid value was 40, and phosphoric acid group-containing polymer particles had a particle size of 320 nm.

Non-Aqueous Dispersion (iv) of This Invention

Into a usual reactor for the production of acrylic resin which was equipped with stirrer, thermometer, reflux condenser, etc., there were introduced 120 parts of xylene, 64 parts of heptane and 55 parts of dispersion stabilizer 2, which were then heated and stirred. When the temperature reached 100° C., a mixture of the following monomers and dispersion stabilizer 2 was added dropwise over a period of five hours.

| | |
|---|---|
| Methyl methacrylate | 55 parts |
| Methyl acrylate | 10 parts |
| 2-Hydroxyethyl acrylate | 20 parts |
| Acid-phosphoxydecyl methacrylate | 15 parts |
| Dispersion stabilizer 2) | 55 parts |
| α, α'-Azobisisobutyronitrile | 1 parts |

After the dropwise addition of the above mixture was over, the resultant mixture was kept at 100° C. for further 30 minutes. Then, to said mixture, there was added dropwise a mixture of 0.5 part of azobisdimethyl valeronitrile and 20 parts of xylene over a period of one hour. The resultant mixture was stirred, while kept at 100° C. for two hours. Then, said mixture was cooled, and, thus, there was produced non-aqueous dispersion (iv) of this invention. In this dispersion (iv), solid content was 45%, acid value was 32, and phosphoric acid group-containing polymer particles had a particle size of 250 nm.

Non-Aqueous Dispersion (v) of This Invention

Into a usual reactor for the production of acrylic resin which was equipped with stirrer, thermometer, reflux condenser, etc., there were introduced 120 parts of xylene, 64 parts of heptane and 55 parts of dispersion stabilizer 2, which were then heated and stirred. When the temperature reached 100° C., a mixture of the following monomers and dispersion stabilizer 2 was added dropwise over a period of five hours.

| | |
|---|---|
| Methyl methacrylate | 55 parts |
| Methyl acrylate | 10 parts |
| 2-Hydroxyethyl acrylate | 20 parts |
| Acid-phosphoxyhexa (oxypropylene) monomethacrylate | 15 parts |
| Dispersion stabilizer 2) | 55 parts |
| α, α'-Azobisisobutyronitrile | 1 parts |

After the dropwise addition of the above mixture was over, the resultant mixture was kept at 100° C. for further 30 minutes. Then, to said mixture, there was added dropwise a mixture of 0.5 part of azobisdimethyl valeronitrile and 20 parts of xylene over a period of one hour. The resultant mixture was stirred, while kept at 100° C. for two hours. Then, said mixture was cooled, and, thus, there was produced non-aqueous dispersion (v) of this invention. In this dispersion v), solid content was 45%, acid value was 31, and phosphoric acid group-containing polymer particles had a particle size of 230 nm.

5) Clear Coatings (B)

(B-i)

In a hydrocarbon type solvent [SWASOL 1000 (trade name of a product of Cosmo Oil Co., Ltd.)], there were mixed and dispersed 40 parts of a carboxyl group-containing acrylic resin (*5), 60 parts of an epoxy group-containing acrylic resin (*6), 10 parts of the non-aqueous dispersion (i) of this invention, 1 part of [TINUBIN 900] (trade name of an ultraviolet absorber of Ciba-Geigy), 2 parts of an equal equivalent mixture of tetrabutylammonium bromide with monobutylphosphoric acid, and 0.1 part of [BYK 300] (trade name of a surface conditioner of BYK Chemie). The viscosity of the resulting mixture was adjusted to 13 seconds by Ford Cup No. 4 at 20° C.

(*5) Carboxyl group-containing acrylic resin:

A polymer composed of 20% of methanol half ester of maleic anhydride, 20% of 4-hydroxy n-butyl acrylate, 40% of n-butyl acrylate and 20% of styrene, which has a number average molecular weight of 3,500, an acid value of 86 mg KOH/g and a hydroxyl value of 78 mg KOH/g.

(*6) Epoxy group-containing acrylic resin:

A polymer composed of 30% of glycidyl methacrylate, 20% of 4-hydroxy n-butyl acrylate, 30% of n-butyl acrylate and 20% of styrene, which has a number average molecular weight of 3,000, an epoxy group content of 2.12 mmole/g and a hydroxyl value of 78 mg KOH/g.

(B-ii)

In SWASOL 1000 (trade name of a hydrocarbon type solvent produced by Cosmo Oil Co., Ltd.), there were mixed and dispersed 45 parts of a carboxyl group-containing acrylic resin (*7), 55 parts of an epoxy group-containing acrylic resin (*6), 10 parts of the non-aqueous dispersion (ii) of this invention, 1 part of TINUBIN 900 (trade name of an ultraviolet absorber of Ciba-Geigy), 2 parts of an equal equivalent mixture of tetrabutylammonium bromide with monobutylphosphoric acid, and 0.1 part of BYK 300 (trade name of a surface conditioner of BYK Chemie). The viscosity of the resulting mixture was adjusted to 13 seconds by Ford Cup No. 4 at 20° C.

(*7) Carboxyl group-containing acrylic resin:

A polymer composed of 20% of methanol half ester of maleic anhydride, 16% of 2-hydroxyethyl acrylate, 44% of n-butyl acrylate and 20% of styrene, which has a number average molecular weight of 3,500, an acid value of 86 mg KOH/g and a hydroxyl value of 78 mg KOH/g.

(B-iii)

In SWASOL 1000 (trade name of a hydrocarbon type solvent produced by Cosmo Oil Co., Ltd.), there were mixed and dispersed 45 parts of a carboxyl group-containing acrylic resin (*7), 55 parts of an epoxy group-containing acrylic resin (*6), 10 parts of the non-aqueous dispersion (iii) of this invention, 1 part of a phthalocyanine blue pigment (produced by Dainichi Seika Colour & Chemicals MFG. CO., LTD.), 1 part of TINUBIN 900 (trade name of an ultraviolet absorber of Ciba-Geigy), 2 parts of an equal equivalent mixture of tetrabutylammonium bromide with monobutylphosphoric acid, and 0.1 part of BYK 300 (trade name of a surface conditioner of BYK Chemie). The viscosity of the resulting mixture was adjusted to 13 seconds by Ford Cup No. 4 at 20° C.

(B-iv)

In SWASOL 1000 (trade name of a hydrocarbon type solvent produced by Cosmo Oil Co., Ltd.), there were mixed and dispersed 45 parts of a carboxyl group-containing acrylic resin (*5), 55 parts of an epoxy group-containing acrylic resin (*6), 10 parts of the non-aqueous dispersion (iv) of this invention, 1 part of TINUBIN 900 (trade name of an ultraviolet absorber of Ciba-Geigy), 2 parts of an equal equivalent mixture of tetrabutylammonium bromide with monobutylphosphoric acid, and 0.1 part of BYK 300 (trade name of a surface conditioner of BYK Chemie). The viscosity of the resulting mixture was adjusted to 13 seconds by Ford Cup No. 4 at 20° C.

(B-v)

In SWASOL 1000 (trade name of a hydrocarbon type solvent produced by Cosmo Oil Co., Ltd.), there were mixed and dispersed 45 parts of a carboxyl group-containing acrylic resin (*5), 55 parts of an epoxy group-containing acrylic resin (*6), 10 parts of the non-aqueous dispersion (v) of this invention, 1 part of TINUBIN 900 (trade name of an ultraviolet absorber of Ciba-Geigy), 2 parts of an equal equivalent mixture of tetrabutylammonium bromide with monobutylphosphoric acid, and 0.1 part of BYK 300 (trade name of a surface conditioner of BYK Chemie). The viscosity of the resulting mixture was adjusted to 13 seconds by Ford Cup No. 4 at 20° C.

(B-vi) (For Comparison; Without the Non-Aqueous Dispersion of This Invention)

In SWASOL 1000 (trade name of a hydrocarbon type solvent produced by Cosmo Oil Co., Ltd.), there were mixed and dispersed 40 parts of a carboxyl group-containing acrylic resin (*5), 60 parts of an epoxy group-containing acrylic resin (*6), 1 part of TINUBIN 900 (trade name of an ultraviolet absorber of Ciba-Geigy), 2 parts of an equal equivalent mixture of tetrabutylammonium bromide with monobutylphosphoric acid, and 0.1 part of BYK 300 (trade name of a surface conditioner of BYK Chemie). Then, the viscosity of the resulting mixture was adjusted to 13 seconds by Ford Cup No. 4 at 20° C.

6) Base coatings (C)

(C-i)

In a mixed organic solvent (xylene/toluene=1/1 by weight), there were mixed and dispersed 65 parts of a polyester resin (*8), 35 parts of a melamine resin (*9) and 10 parts of a resin containing both phosphoric acid group and hydroxyl group (*10), and, thus, the viscosity was adjusted to 13 seconds by Ford Cup No. 4 (20° C.).

(*8) Polyester resin:

Phthalic anhydride-hexahydrophthalic anhydride type polyester resin, having a number-average molecular weight of about 3,500, a hydroxyl value of 82 mg KOH/g and an acid value of 8 mg KOH/g.

(9*) UBAN 28-60:

Trade name of a melamine resin produced by Mitsui Toatsu Chemicals, Inc.

(10*) Resin containing both phosphoric acid group and hydroxyl group:

Prepared by mixing, in an organic solvent (xylene), a resin containing phosphoric acid group, hydroxyl group and alkoxymethylamide group, said resin having an acid value of 21 mg KOH/g, a hydroxyl value of 72 mg KOH/g and a number average molecular weight of 11,000, and the same resin being produced by polymerizing 5 parts of acid-phosphoxyethyl methacrylate, 15 parts of 2-hydroxyethyl methacrylate, 15 parts of N-butoxymethylacrylamide, 20 parts of styrene, 15 parts of butylmethacrylate and 30 parts of 2-ethylhexyl methacrylate in an equal weight solvent mixture of xylene and butanol.

(C-ii)

In SWASOL 1000 (trade name of a hydrocarbon type solvent produced by Cosmo Oil Co., Ltd.), there were mixed and dispersed 65 parts of a polyester resin (*8), 35 parts of a melamine resin (*9), 10 parts (solid) of the non-aqueous dispersion (i) of this invention, 1 part of TINUBIN 900 (trade name of an ultraviolet absorber of Ciba-Geigy), 2 parts of an equal equivalent mixture of tetrabutylammonium bromide with monobutylphosphoric acid, and 0.1 part of BYK 300 (trade name of a surface conditioner of BYK Chemie). Then, the viscosity of the resulting mixture was adjusted to 13 seconds by Ford Cup No. 4 at 20° C.

(C-iii)

In SWASOL 1000 (trade name of a hydrocarbon type solvent produced by Cosmo Oil Co., Ltd.), there were mixed and dispersed 65 parts of a polyester resin (*8), 35 parts of a melamine resin (*9), 10 parts (solid) of the non-aqueous dispersion (ii) of this invention, 1 part of TINUBIN 900 (trade name of an ultraviolet absorber of Ciba-Geigy), 2 parts of an equal equivalent mixture of tetrabutylammonium bromide with monobutylphosphoric acid, and 0.1 part of BYK 300 (trade name of a surface conditioner of BYK Chemie). Then, the viscosity of the resulting mixture was adjusted to 13 seconds by Ford Cup No. 4 at 20° C.

(C-iv) (For Comparison)

There were mixed and dispersed, in an organic solvent mixture (xylene/toluene=1/1 by weight), 65 parts of a polyester resin (*8) and 35 parts of a melamine resin (*9). Then, the viscosity of the resulting mixture was adjusted to 13 seconds by Ford Cup No. 4 at 20° C.

7) Metallic Compositions (D)

(D-i)

A mixture of 5 parts of a leafing type aluminum flake (*3) with 95 parts of an organic solvent (*11).

(*11) Organic solvent:

An equal-weight solvent mixture of toluene (surface tension: 30.9 dyn/cm) with m-xylene (surface tension: 31.23 dyn/cm)

(D-ii)

A mixture of 3 parts of a leafing type aluminum flake (*12) with 97 parts of an organic solvent (*11).

(*12) Hi Print 60T

Trade name of a paste containing 32% of mineral spirit produced by Toyo Aluminium K.K., each flake having a lengthwise direction size of 4.4 μm and a thickness of 0.2 μm.

(D-iii) (For Comparison)

A mixture of 5 parts of a non-leafing type aluminum flake (*4) with 95 parts of an organic solvent (*11).

EXAMPLE AND COMPARATIVE EXAMPLES

Examples 1 to 5 and Comparative Examples 1 to 3

Onto the uncured intermediate coating film which had been applied on each piece to be coated, there was applied the metallic coating (A-i) or (A-ii) so that the film might have a thickness of 5 μm when cured. Then, after left to stand at room temperature for 5 minutes, the piece was heated at 140° C. for 30 minutes, and, thus, both the intermediate coating film and the metallic coating film were cured. Subsequently, onto the metallic coating film of each piece, there was applied one of the clear coatings (B-i)-(B-vi) separately, so that the film of the clear coating might have a thickness of 35 to 40 μm when cured. Then, after left to stand at room temperature for 5 minutes, each piece was heated at 140° C. for 30 minutes, and, thus, the clear coating film was cured.

Table 1 shows the results of property test of thus obtained films.

the highlight luminance and the frontal brightness. The higher this FF value is, the stronger is light-dark contrast feeling, which means that a chrome plating-like finish has been achieved.

(*6) C* Value

CIE metric chroma at the light-reception angle of 15° was measured with use of MA 68. This C* value indicates chroma in the highlight of coating film. The higher this value is, the more vivid is the color of coating film.

(*7) Appearance

Results of visual evaluation of coating film. The mark ○ shows that a chrome plating-like finish has been achieved. The mark ⊙ shows that a chrome plating-like finish with candy tone has been achieved. The mark X shows that not

TABLE 1

|  | Examples | | | | | Comparative Examples | | |
| --- | --- | --- | --- | --- | --- | --- | --- | --- |
|  | 1 | 2 | 3 | 4 | 5 | 1 | 2 | 3 |
| Metallic coating | A-i | A-i | A-i | A-i | A-i | A-ii | A-i | A-ii |
| Clear coating | B-i | B-ii | B-iii | B-iv | B-v | B-i | B-vi | B-vi |
| Results of Property Test | | | | | | | | |
| Wettability (*1) | ○ | ○ | ○ | ○ | ○ | ○ | Δ | ○ |
| Adhesivity (*2) | ○ | ○ | ○ | ○ | ○ | ○ | X | ○ |
| IV value (*3) | 383 | 381 | 60 | 385 | 380 | 232 | 379 | 230 |
| SV value (*4) | 13.5 | 14 | 4.5 | 13.8 | 13.9 | 29.3 | 14 | 29.8 |
| FF value (*5) | 1.86 | 1.86 | 1.72 | 1.86 | 1.86 | 1.55 | 1.86 | 1.55 |
| C* value (*6) | 1.9 | 1.7 | 83 | 2.2 | 1.5 | 2.9 | 2.2 | 3.1 |
| Appearance (*7) | ○ | ○ | ⊙ | ○ | ○ | X | ○ | X |

Method of Property Test (*1) Wettability

Clear coating was spray-applied on the surface of cured metallic coating, and the degree of wetting was visually evaluated. The mark ○ shows good wetting, Δ poor wetting, and X very poor wetting.

(*2) Adhesivity

Cross-cut lines were made with a cutter so that the cutter edge might reach the base plate through the multi-layer coating film, and, thus, there were formed 100 squares each having a size of 1 mm×1 mm. Next, Scotch tape was applied on the surface of said squares, and, then, the tape was peeled off rapidly, and, thus, the surface of the coated film was observed. The mark ○ shows that no square had been peeled off at all, while X shows that 10 or more squares had been peeled off.

(*3) IV Value

Y value at the light-reception angle of 15° was measured with use of a portable goniophotometer MA 68 (produced by X-Rite Co.). This IV value indicates the brightness of a coating film, and shows the luminous feeling of highlight portion of metallic coating film. This value means that, the larger it is, the more luminous is the coating film.

(*4) SV Value

Y value at the light-reception angle of 45° was measured with use of MA 68. This SV value indicates the brightness of coating film, and shows the frontal colour brightness of coating film. The lower this value is, the darker is the coating film, which means that aluminum flake is horizontally oriented to give little diffuse light.

(*5) FF Value

Calculated from the equation:

$$FF=(IV-SV)/[(IV+SV)/2]$$

with use of the above-mentioned IV value and SV value measured by MA 68. This FF value shows contrast between a chrome plating-like finish but an ordinary metallic-feeling finish has been achieved.

Examples 6 to 8 and Comparative Examples 4 to 6

Onto the uncured intermediate coating which had been applied on each piece to be coated, there was applied one of base coatings (C-i) to (C-iv) separately. Then, on the uncured base coating, there was applied one of metallic compositions (D-i) to (D-iii) separately. After left to stand at room temperature for three minutes, each piece was heated at 140° C. for 30 minutes, and, thus, each of the resultant multi-layer coatings was cured. Subsequently, onto the metallic coating film of each piece, there was applied one of the clear coatings (B-i), (B-ii) and (B-vi) separately. Then, each piece was heated at 140° C. for 30 minutes, and, thus, the clear coating film was cured.

Table 2 shows the results of property test of thus obtained multi-layer coating films.

TABLE 2

|  | Examples | | | Comparative Examples | | |
| --- | --- | --- | --- | --- | --- | --- |
|  | 6 | 7 | 8 | 4 | 5 | 6 |
| Base coating | | | | | | |
| Name | c-i | c-ii | c-iii | — | c-i | c-iv |
| Film thickness | 10–15 μm as a cured film | | | | | |
| Drying | Left at room temperature for 3 minutes (uncured) | | | | | |
| Metallic composition | | | | | | |
| Name | D-i | D-i | D-ii | D-i | D-iii | D-i |
| Film thickness | 1.3–2 μm as a cured film | | | | | |

TABLE 2-continued

| | Examples | | | Comparative Examples | | |
|---|---|---|---|---|---|---|
| | 6 | 7 | 8 | 4 | 5 | 6 |
| Curing | 140° C. for 30 minutes | | | | | |
| Clear coating | | | | | | |
| Name | B-i | B-i | B-ii | B-vi | B-i | B-vi |
| Film thickness | 35–40 μm as a cured film | | | | | |
| Curing | 140° C. for 30 minutes | | | | | |
| Results of Property Test | | | | | | |
| Wettability (*1) | ○ | ○ | ○ | Δ | ○ | Δ |
| Adhesivity (*2) | ○ | ○ | ○ | X | ○ | X |
| IV value (*3) | 383 | 381 | 58 | 380 | 232 | 379 |
| SV value (*4) | 13.5 | 14.0 | 4.9 | 13.9 | 29.1 | 14.0 |
| FF value (*5) | 1.86 | 1.86 | 1.69 | 1.86 | 1.55 | 1.86 |
| C* value (*6) | 1.9 | 1.7 | 70 | 1.5 | 2.0 | 2.2 |
| Appearance (*7) | ○ | ○ | ⊚ | ○ | X | ○ |

Property test was conducted in the same manner as in Table 1.

What is claimed is:

1. A phosphoric acid group-containing non-aqueous dispersion which comprises polymer particles dispersed in a solution of macromolecular dispersion stabilizer dissolved in an organic solvent, said polymer particle being a particle of polymer which is composed of a phosphoric acid group-containing polymerizable unsaturated monomeric unit as a constituent component.

2. The non-aqueous dispersion of claim 1 wherein the phosphoric acid group-containing polymerizable unsaturated monomer is selected from the group consisting of
   (i) a compound which contains, in one molecule, both at least one phosphoric acid group having the formula

   —O—PO(OH)(R₁)

wherein R₁ is a hydroxyl group, a phenyl group or an alkyl group having 1 to 20, carbon atoms, and at least one polymerizable unsaturated bond;
   (ii) an equimolar adduct of glycidyl (meth)acrylate with a mono-C$_{1-20}$ alkyl phosphoric acid ester; and
   (iii) a compound having the formula

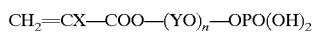
   CH₂=CX—COO—(YO)$_n$—OPO(OH)₂ wherein X denotes a hydrogen atom or a methyl group, Y denotes an alkylene group having 2 to 4 carbon atoms, and n denotes an integer of 3 to 30.

3. The non-aqueous dispersion of claim 1 wherein the phosphoric acid group-containing polymerizable unsaturated monomer is acid-phosphoxy-C$_{2-10}$ alkyl (meth)acrylate.

4. The non-aqueous dispersion of claim 1 wherein the polymer particles are formed either by the polymerization of a phosphoric acid group-containing polymerizable unsaturated monomer, or by the copolymerization of a phosphoric acid group-containing polymerizable unsaturated monomer with another copolymerizable monomer.

5. The non-aqueous dispersion of claim 4 wherein said another copolymerizable monomer is a (meth)acrylic acid ester.

6. The non-aqueous dispersion of claim 4 wherein said copolymerization is conducted between 0.5 to 50% by weight of phosphoric acid group-containing polymerizable unsaturated monomer and 99.5 to 50% by weight of another copolymerizable monomer, based on the total amount of these two monomers.

7. The non-aqueous dispersion of claim 1 wherein said macromolecular dispersion stabilizer is substantially incompatible with said polymer particles although compatible with said organic solvent.

8. The non-aqueous dispersion of claim 1 wherein said macromolecular dispersion stabilizer has a weight average molecular weight ranging from 1,000 to 50,000, a hydroxyl value ranging from 0.5 to 200 and an acid value ranging from 0.5 to 100.

9. The non-aqueous dispersion of claim 1 wherein said macromolecular dispersion stabilizer is an acrylic resin dispersion stabilizer which has an average of 0.2 to 1.2 polymerizable unsaturated bonds per molecule.

10. The non-aqueous dispersion of claim 1 wherein said polymer particles has an average particle size ranging from 0.01 to 1 μm.

11. The non-aqueous dispersion of claim 1 which is produced by subjecting monomeric components which contain a phosphoric acid group-containing polymerizable unsaturated monomer to dispersion polymerization in a solution of macromolecular dispersion stabilizer dissolved in an organic solvent.

12. The non-aqueous dispersion of claim 11 wherein 0.1 to 70% of macromolecular dispersion stabilizer and 99.9 to 30% of monomeric components, based on the total weight of solid contents of both macromolecular dispersion stabilizer and monomeric components, are polymerized.

13. The non-aqueous dispersion of claim 11 wherein the concentration of the total solid contents of both macromolecular dispersion stabilizer and monomeric components ranges from 5 to 60% by weight.

14. The non-aqueous dispersion of claim 2 wherein R₁ is an alkyl group having 2 to 10 carbon atoms.

15. The non-aqueous dispersion of claim 2 wherein n denotes an integer of 3 to 20.

* * * * *